United States Patent [19]
Argyle et al.

[11] Patent Number: 5,392,169
[45] Date of Patent: Feb. 21, 1995

[54] ELECTRICAL MEANS TO DIMINISH READ-BACK SIGNAL WAVEFORM DISTORTION IN RECORDING HEADS

[75] Inventors: Bernell E. Argyle, Putnam Valley; Anthony P. Praino, Poughquag, both of N.Y.; Mark E. Re, Los Gatos, Calif.; Rudolf Schäfer, Hollfeld, Germany; Shinji Takayama, Mitaka, Japan; Philip L. Trouilloud, Ossining, N.Y.

[73] Assignee: International Business Machines Corporation, Armonk, N.Y.

[21] Appl. No.: 73,187
[22] Filed: Jun. 8, 1993
[51] Int. Cl.⁶ .................. G11B 5/09; H01F 13/00; H01H 47/00; G11C 19/08
[52] U.S. Cl. .................. 360/45; 361/149; 365/38
[58] Field of Search .......... 360/45, 46, 62, 126, 360/128, 125, 123; 361/149, 267; 365/10, 29, 30, 31, 38, 86, 139

[56] References Cited

U.S. PATENT DOCUMENTS

| | | | |
|---|---|---|---|
| 3,585,615 | 6/1971 | Takahashi et al. | 365/139 X |
| 3,611,417 | 10/1971 | Sauter et al. | 360/123 |
| 3,670,312 | 6/1972 | Broadbent | 365/86 |
| 3,811,119 | 5/1974 | Almasi et al. | 365/29 X |
| 3,842,407 | 10/1974 | Argyle et al. | 365/10 |
| 3,911,411 | 10/1975 | Argyle et al. | 365/31 |
| 4,086,644 | 4/1978 | Horian et al. | 361/149 |
| 4,135,219 | 1/1979 | Yoshizawa et al. | 360/128 |
| 4,178,636 | 12/1979 | Argyle et al. | 365/30 |
| 4,183,070 | 1/1980 | Fujita | 360/128 |
| 4,224,649 | 9/1980 | Alexandroivich | 361/149 X |
| 4,462,059 | 7/1984 | Yamagami et al. | 361/149 |
| 4,843,509 | 6/1989 | Andreas | 360/128 |
| 4,849,843 | 7/1989 | Fujita et al. | 360/128 |
| 4,851,945 | 7/1989 | Fritsch et al. | 360/128 |
| 4,970,621 | 11/1990 | Gailbreath et al. | 361/149 |
| 4,992,902 | 2/1991 | Tani | 360/128 |
| 5,032,945 | 7/1991 | Argyle et al. | 360/125 X |
| 5,053,892 | 10/1991 | Supino, Jr. et al. | 360/62 |
| 5,218,500 | 6/1993 | Okuda et al. | 360/126 |
| 5,220,474 | 6/1993 | Okmori | 360/128 |
| 5,270,894 | 12/1993 | Okuda et al. | 360/126 |

OTHER PUBLICATIONS

Ichinose et al, "Single-Crystal Ferrite Technology For Monolithic Disk Heads", IEEE Transaction on Magnetics, vol. 26, No. 6, Nov. 1990.

Kurachi et al, "Magnetic Head Training Algorithm To Suppress Peak Shift", IBM Technical Disclosure Bulletin, vol. 32, No. 12, p. 462, May 1990.

Schäfer et al, "Domain in Single-Crystal Ferrite MIG Heads with Image-Enhanced, Wide-Field, Kerr Microscopy", IEEE Transactions on Magnetics, vol. 28, pp. 2644-2646, Sep. 1992.

Schäfer et al, "Domain Studies in Single-Crystal Ferrite MIG Heads with Image-Enhanced, Wide-Field, Kerr Microscopy", Post-Deadline Invited Paper at the 6th International Conference on Ferrites, Tokyo, Sep. 19-Oct. 2, 1992; also, poster presentation at the 1992 Annual Magnetism and Magnetic Materials Conf. held in St. Louis in Nov. 1992.

Schäfer et al "Grain Influences on Magnetic Domains and Readback Pulse Distortions in Ferrite MIG Heads", presented at International Magnetics Conference, Folkets Haus, Stockholm, Sweden, Apr. 13-16, Paper No. GP-7, 1993.

*Primary Examiner*—Donald Hajec
*Assistant Examiner*—Patrick Wamsley
*Attorney, Agent, or Firm*—Heslin & Rothenberg

[57] ABSTRACT

A method and apparatus for conditioning a magnetic read/write head to substantially eliminate read-back pulse distortions associated with unfavorable magnetic domain patterns in the head stores the polarity of the last write current pulse of a write pulse train applied to the head-coils. This polarity is compared to a pre-determined reset current pulse polarity. If the last write current polarity is opposite to the reset current polarity, then a reset pulse, or a series of pulses, having the pre-determined reset polarity is applied to the head prior to performing a read operation with the head. The pre-determined reset polarity corresponds to the polarity that resets the head to the magnetic domain state most preferred for reading due to reduction of read-back distortion. The reset pulse, or pulse train, according to the present invention is of constant polarity. If the last write current pulse polarity is the same as the reset polarity, then no reset pulse is applied to the head. Prior to applying the reset pulse, the head is either re-positioned or, if not re-positioned, the reset pulse is applied to the head only when it is flying over a sector gap.

45 Claims, 6 Drawing Sheets

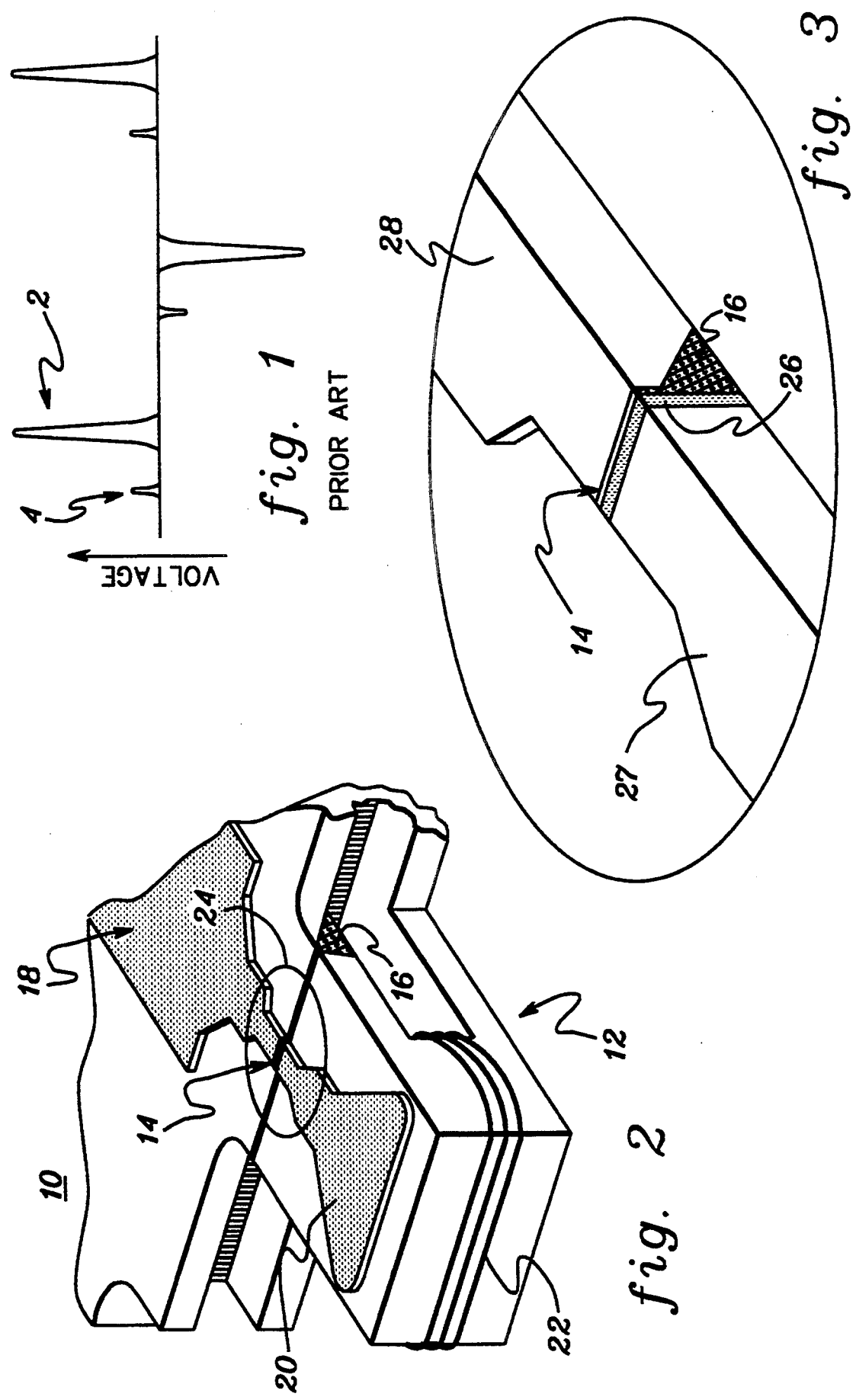

ELECTRICAL MEANS TO DIMINISH READ-BACK SIGNAL WAVEFORM DISTORTION IN RECORDING HEADS

FIELD OF THE INVENTION

The present invention relates generally to magnetic read/write heads, and in particular to the conditioning or resetting of magnetic read/write heads used for high-density recording storage.

BACKGROUND OF THE INVENTION

The use of magnetic read/write heads for the high-density storage of digital information in magnetic media is well-established. For example, the use of ferrite metal-in-gap (MIG) heads is being extended beyond audio and visual applications to high-density digital storage. Indeed, most direct-access storage devices today use such heads. However, as the storage density for digital data recording has increased, an increasing number of distortions that affect the read-back of data from these magnetic media have become more significant because of the smaller signal-to-noise ratios associated with read-back of smaller magnetic transitions in higher density recording.

The distortions addressed by the present invention are intrinsic to the head, not to the medium, and are of increasing significance for heads designed for smaller track-widths such as, for example, smaller than about 10 microns. Distortions in read-back signals obtained with polycrystalline ferrite (PCF) MIG heads include: a leading-edge precursory phenomenon in isolated read-back pulses, asymmetry in peak timing for closely-spaced pulses, broadening of the distribution of waveform parameters between write cycles, and a delayed relaxation following isolated pulses. These distortions are reported in the literature to originate in micromagnetic responses associated with the granular ferrite at or near the leading side of the gap. However, only indirect evidence of this has been cited along with speculation as to the model mechanisms.

It is known that these types of read-back distortions can be diminished by a head construction that utilizes single-crystal ferrite (SCF) instead of PCF. However, SCF heads often produce another type of distortion in the form of weak subsidiary, or secondary, pulses which are slightly separated from the main pulse associated with the gap (i.e. the gap pulse). This is illustrated in FIG. 1, which is a schematic of a typical read-back signal for a single crystalline ferrite head traversing a magnetic medium. More specifically, FIG. 1 illustrates main gap and secondary pulses obtained when reading a series of test transitions previously written onto the medium. In FIG. 1, the read-back signal voltage is represented by the vertical axis and the position of the head is represented by the horizontal axis. A main gap pulse 2 is shown separated from a weak secondary pulse 4. In a typical head this separation is, for example, about 5 to 20 microns.

Direct evidence from magneto-optical Kerr-effect contrast has associated these secondary pulses with the presence of so-called zig-zag domain walls in the ferrite. Zig-zag walls are relatively stable and thus are different in nature from mechanisms that generate distortion only during a time period immediately following the end of a write sequence. This time period is generally less than several hundred microseconds. Initially, following manufacture of a MIG head from a single-crystal ferrite, the region of the head near the pole tip is in a single-magnetic-domain surface state. However, after typical write current pulses are applied to the head coils, as when writing bits of information to the magnetic medium, the head will typically exhibit more than one surface domain. Separating these domains are zig-zag walls which have been nucleated at the gap and propelled away therefrom by the application of write current pulses to the head. The zig-zag walls remain substantially stable following removal of the write pulse.

The distance that the zig-zag walls are propelled depends on the amplitude of the write current pulse and is affected by material defects such as non-magnetic inclusions. Heads containing such defects in the ferrite pole are typically the ones that exhibit the secondary pulse distortion. Specifically, when the main gap pulses are closely spaced in time as is necessary for high-density recording, the convolution of secondary pulses with the main gap pulses causes pulse-wave distortion and variability. The resulting bit-shift and amplitude variability during read-back cause a higher error rate. Distortions due to secondary pulses have been associated with the pinning of the zig-zag wall by a defect as described above.

Although the detailed mechanism producing these secondary pulses is not yet fully understood, correlations of Kerr-domain-contrast images with read-back distortions strongly indicate that it is primarily associated with one or more defect sites and the presence of zig-zag walls. The defect sites are identifiable by their capability to pin a zig-zag wall. This pinning is visible at a position where zig-zag wall propulsion, which is induced by the application of a current to the head coils, is locally inhibited by such a defect. Pinning of zig-zag walls is discussed in greater detail later.

More specifically, it is believed that secondary pulses are associated with heads having one or more defect sites such as result from non-magnetic inclusions or voids, or from particulate contamination, such as airborne magnetic debris or debris stemming from possible wear products from disks, heads, or rotating hubs in the file. Any debris that becomes imbedded or attached to the ferrite surface of the head can have an effect on the response of the ferrite in the vicinity of the particle. Because it has been determined that secondary pulses are not significant where the ferrite head is in a single-domain surface state (i.e. exhibiting an absence of zig-zag walls), it would be advantageous to remove any zig-zag walls present in a head prior to the read-back of bits in a medium.

It should be noted that the distortion described above that has been associated with zig-zag walls is different from distortion that has been associated with diffusion of the metal, typically sendust, into the ferrite region of an MIG head. When such diffusion has occurred, a portion of the ferrite in contact with the sendust has been rendered non-magnetic leading to the formation of a second, parasitic, gap. Because this secondary gap causes stray field leakage, a secondary read-back pulse is observed in addition to the main read-back pulse. Although this diffusion problem has been solved in the industry by the use of a diffusion-blocking layer of silicon, distortion from secondary pulses associated with zig-zag walls above is due to a different phenomenon and still remains a problem.

Thus, there is a need for a method of removing zig-zag walls from a read/write head prior to using the head to read data from magnetic media so that distortion in the read-back waveform corresponding thereto is substantially reduced.

SUMMARY OF THE INVENTION

This need is satisfied, the limitations of the prior art overcome, and other benefits realized in accordance with the principles of the present invention by a method for conditioning or resetting a read/write head that stores the polarity of the last write current pulse of a write pulse train applied to the head-coils. This polarity is compared to a predetermined reset current pulse polarity. If the last write current polarity is opposite to the reset current polarity, then a reset pulse, or a series of pulses, having the pre-determined reset polarity is applied to the head prior to performing a read operation with the head. The pre-determined reset polarity corresponds to the polarity (e.g. positive or negative) that resets the head to the magnetic domain state most preferred for reading. The preferred state corresponds to that state which most reduces the adverse affects of distortion in the read-back waveform, for example, from weak secondary pulses. The reset pulse, or pulse train, according to the present invention is of constant polarity, which is in contrast to an alternating current waveform that changes polarity periodically. Further, in the preferred embodiment each reset pulse is of substantially equal magnitude and of a duration about the same as that for the preceding write pulses.

If the last write current pulse polarity is the same as the reset polarity, then no reset pulse is applied to the head. A reset pulse is not necessary in this case because the head is already in the preferred magnetic domain state, which results from the application of a head-coil current (in this case, the last write pulse) corresponding to the reset polarity.

In the preferred embodiment the storage of the polarity of the last write pulse is accomplished using a one-bit register. Prior to applying a reset pulse, the head is either positioned over a dedicated track of the magnetic medium which does not correspond to stored data, or the reset pulse is applied only during those time periods in which the head is flying over gaps in the data sectors of the medium (these areas are not used to store data). In the preferred embodiment, the magnitude of each reset pulse is equal to or greater than that of the largest write current pulse applied to the head since the last-applied reset pulse train.

In an alternate embodiment of the present invention, the head is returned to a single-domain surface state by always applying a reset pulse having the reset polarity to the head prior to reading regardless of the polarity of the last write current pulse. In the case where the last write polarity is different from the reset polarity, substantially the same result as above will occur. On the other hand, where the last write polarity is the same as the reset polarity, a reset pulse having the reset polarity is applied to the head even though it is already in the preferred magnetic domain state. The head will remain in the preferred state because the application of more than one current pulse having the reset polarity does not remove the head from the preferred domain state, but is instead somewhat redundant in its effect on the head. Unlike the previous embodiment, in this embodiment, following every write pulse train and prior to reading, the head is always either re-positioned for applying a reset pulse or a reset pulse is applied when the head is over a sector gap.

In both the preferred and alternate embodiments of the present invention, an important advantage is that prior to performing any read-back operation, the head is returned to a single-domain surface state. In this state all zig-zag walls have been substantially removed. Thus, the read-back waveform will not exhibit weak secondary pulses. Other advantages are that in the absence of secondary pulses, and particularly their convolutions with the main gap pulse, amplitude and timing uncertainty in the read-back signal (which is also known as jitter and bit-shift) is reduced so that waveform detection, analog-to-digital conversion, pulse shaping, equalizing, and filtering can be accomplished with greater simplicity and increased reliability.

The foregoing and other objects, features, and advantages of the invention will be apparent from the following more particular description of a preferred embodiment of the invention, as illustrated in the accompanying drawings.

BRIEF DESCRIPTION OF THE DRAWINGS

FIG. 1 is a schematic of a typical read-back signal for a single crystalline ferrite head traversing a magnetic medium and illustrates main gap and secondary pulses obtained when reading a series of test transitions previously written onto the medium.

FIG. 2 is a perspective view illustrating the portion of a single crystalline ferrite slider, which is used in high-density digital storage applications, containing an MIG read/write head.

FIG. 3 is a detailed view of that portion of the MIG head of FIG. 2 proximate to the gap thereof.

BEST MODE FOR CARRYING OUT THE INVENTION

Figure 4:
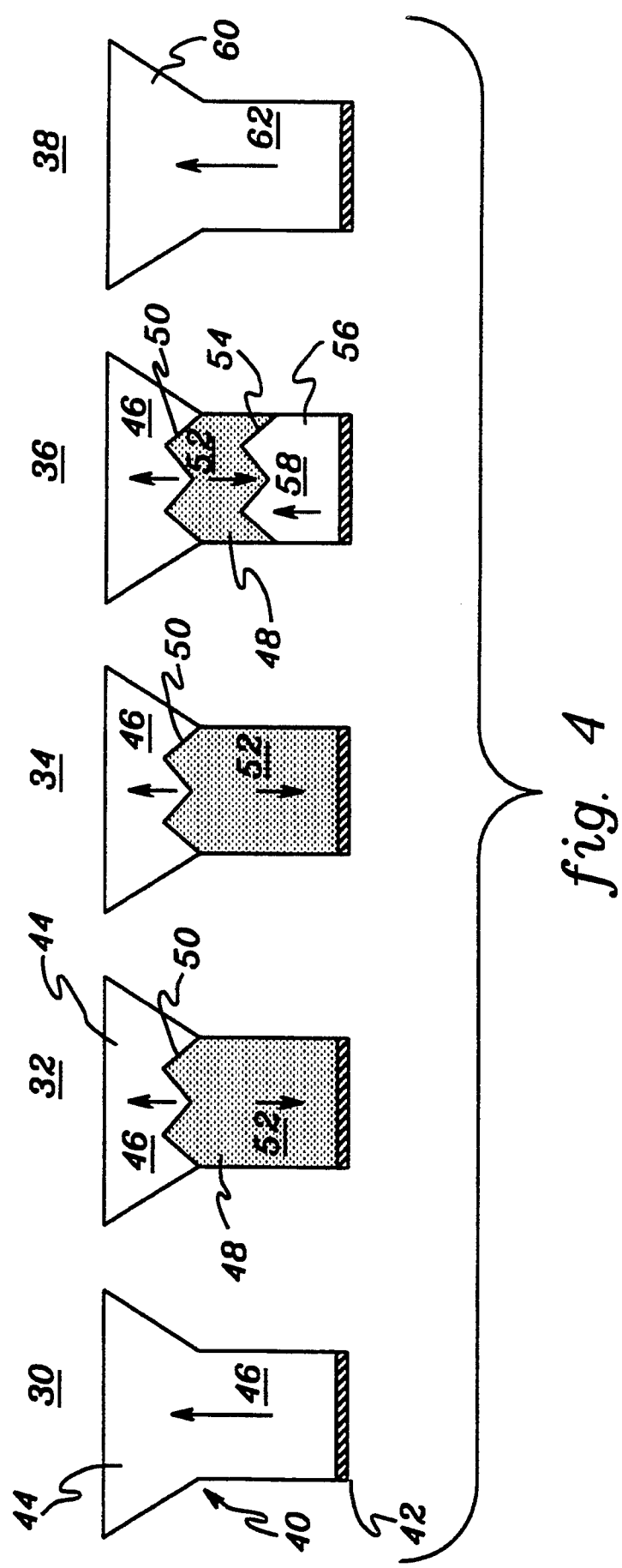
FIG. 4 illustrates the nucleation of a first zig-zag wall from the gap of an MIG head and its subsequent annihilation by the nucleation of a second zig-zag wall.

The present invention is described in detail below, first, by describing the environment in which an MIG head is used; second, by describing the creation and annihilation of zig-zag walls from MIG heads prior to reading bits from a storage medium; third, by describing the effects of a weak secondary pulse on a read-back waveform; and fourth, by describing operational aspects of the present invention.

FIG. 2 is a perspective view illustrating the portion of a single crystalline ferrite slider 10, which is used for recording and reading magnetically-stored media transitions, or bits, in high-density digital storage. Slider 10 contains an MIG read/write head 12 which has a gap 14 filled by glass 16. An air-bearing surface 18 and a wear pad 20 are located on top of head 12. Air-bearing surface 18 is the portion of head 12 that is closest to the magnetic medium. Head 12 also has head-coils 22 which are used to apply a write current pulse or a reset current pulse thereto. Head-coils 22 are also used to detect flux pulses when reading bits from the magnetic medium. In addition, as head 12 flies over the magnetic medium, head-coils 22 are on the side of gap 14 that corresponds to the trailing side of the head. The opposite side of gap 14 corresponds to the leading side of the head. The head may also have a film of permalloy as is known in the art. A close-up view of the region of head 12 indicated by line 24 in FIG. 2 is shown in FIG. 3.

As the head flies over the magnetic medium, the head-coil side of the gap corresponds to the trailing side of the head while the opposite side of the gap corresponds to the leading side. In the preferred embodiment, head 12 is a MnZn single-crystalline ferrite head. However, in other embodiments, head 12 could be made of, for example, various compositions of MnZn-ferrite, NiZn-ferrite, or permalloy.

FIG. 3 is a more detailed view of that portion of head 12, including gap 14 and glass 16, indicated by line 24 in FIG. 2. A part of this portion is shown in cross-section in FIG. 3 to illustrate additional detail regarding the shape of head 12 in the region near gap 14. In the preferred embodiment, head 12 is an MIG head, and the metal used in the preferred embodiment is sendust. A region of sendust 26 is shown disposed laterally alongside gap 14. As is well known, sendust is a high moment alloy layer having high permeability and low coercivity. The alloy contains iron, aluminum, and silicon. However, in other embodiments sendust 26 could be replaced by other high-moment soft alloys having a low coercivity and high permeability. Head 12 has a trailing side 27 and a leading side 28 as shown in FIG. 3. As is known in the art, the flux in the head caused by the application of a write current is most concentrated in the region at the pole tip of the head. More specifically, the apex angle at the pole tip concentrates the flux in the head. This concentration of flux causes zig-zag wall nucleation at the gap.

Although a single sendust layer is illustrated in FIG. 3, the scope of the present invention is intended to also include so-called double MIG heads in which there is a sendust layer on each pole tip. Double MIG heads are expected to exhibit zig-zag walls similar to single MIG heads. However, the threshold for nucleating a zig-zag wall, which is discussed in greater detail later, is expected to be larger with a double MIG head, but the zig-zag walls may still be substantially removed using the present invention.

It should be noted here that although the nucleation and propagation of zig-zag walls due to the application of a write current pulse to the head-coils is generally described throughout, a person skilled in the art understands that an erase pulse, which is used to erase a bit of information stored in a magnetic medium, will nucleate and propagate zig-zag walls in substantially the same manner as a write current pulse. Thus, the description provided here also applies to current pulse patterns including an erase pulse, and the scope of the present invention is intended to include conditioning of a head previously subjected to one or more erase pulses. Further, in general, where the description refers to write pulses, it is understood that the description is also substantially applicable to pulses characterized as erase pulses.

FIG. 4 illustrates the different states 30-38 in the consecutive nucleation of a first zig-zag wall from the gap of an MIG head and its subsequent annihilation by the nucleation of a second zig-zag wall. FIG. 4 illustrates the portion of a magnetic read/write head 40 that is proximate to a gap 42 (the glass in the gap region is not shown). The portion shown may correspond to either the trailing or leading side of a head (typically, the trailing side has a layer of sendust or other high moment metal). The method of the present invention is substantially similar for either the trailing or leading side.

In general, zig-zag walls are generated when a current pulse is applied to the head-coils of a magnetic head. The magnitudes of currents typically used to write or erase bits in a magnetic medium are typically larger than the threshold required to generate zig-zag walls. These walls are observable using Kerr-effect microscopy for current pulses applied to single-crystal ferrite MIG heads, and it is expected that such walls would also be observable using scanning electron microscopy with polarization analysis (SEMPA). To observe zig-zag walls experimentally, magnetic domains are imaged using, for example, the longitudinal Kerr effects in a wide-field Zeiss Axiomat polarizing microscope with oil immersion objective lens, a Hg-arc lamp, and nearly-crossed polarizers. Longitudinal Kerr contrast detects mostly in-plane domains. Improved longitudinal contrast may be obtained when an optical compensator is also introduced in the optical path and adjusted for reducing ellipticity in the oblique light reflected from the head so subsequent analyzer/polarizer adjustments can provide increased contrast ratios for two opposing domain intensities. The resulting Kerr contrast between nearly-crossed analyzers may be too weak to observe by the naked eye, so Kerr contrast is typically video-detected, subjected to an analog-to-digital conversion, and then image-enhanced.

Digital image enhancement may typically include integrating several images, storing the result in a frame memory, and subtracting a similar sum of images representing another magnetic state. This procedure may be repeated several times to build up contrast in the difference-image. A reference magnetic state is typically, but not necessarily, the uniform saturated state. The region of the head pole is most readily saturated because it is the region of highest flux concentration. This process of image subtraction is also useful to remove background "non-magnetic light" caused, for example, by light scattering, depolarization, and imperfect optical elements, which include those providing poor extinction ratios with crossed polarizers due to strain-induced birefringence (the extinction ratio is the ratio of light intensity passing through the optical system with polarizers crossed at right angles to the light intensity passing therethrough with polarizers set parallel to each other).

Referring now to state 30 in FIG. 4, initially, following manufacture, a head is typically in a magnetization state corresponding to only one surface domain having no domain walls (i.e. a single-domain surface state). The air-bearing surface of head 40 exhibits a single surface domain 44, which has a magnetization component along the head axis as indicated by component arrow 46. As will be discussed later, a head that has had a positive current pulse of sufficient magnitude applied will also exhibit the properties of state 30 just described. In this example, the reset polarity is positive because such a positive current pulse returns head 40 to a preferred magnetic domain state for later reading. A person skilled in the art will recognize, however, that in other cases the reset polarity can be negative.

In general, a particular head exhibits a natural bias which results from the way it is manufactured and which defines the preferred pulse polarity for resetting the head to the preferred domain pattern once the preferred head state has been disturbed. One effect of this bias may be that the reset pulse may have a smaller magnitude for one polarity than the other. The preferred pulse polarity may originate from, for example, asymmetry in the distribution of the coil windings, the yoke shape, stress, the apex shape, the head composition, the presence of a magnetic field, or the disposition of other elements such as the placement of the sendust layer relative to the gap center. In some cases the effect of these factors is controllable or known so that the preferred pulse polarity can be predetermined. The single domain state described herein is one example of a preferred head state. In other heads, the preferred head state may correspond to a state with more than a single domain.

State 32 illustrates the axial components of the magnetic surface domains after a negative current pulse of sufficient magnitude is applied to the head (the magnitude of current required to form a second surface domain is described in detail later). A second surface domain 48 having a magnetization axial component 52 is formed by the application of, for example, a negative 45 mA current pulse. This pulse nucleates a zig-zag wall 50 at gap 42 and propagates it away therefrom and causes reversal of part of the existing surface domain 46, changing the magnetization axial component from direction 46 to 52 as it propagates. Zig-zag wall 50 separates domains 44 and 48. State 32 corresponds to the state existing during the application of the current to the head-coils.

State 34 illustrates the surface domains after the current of state 32 has been removed. State 34 is substantially the same as state 32. In other words, state 34 is a remanent state that does not change when the current pulse is removed. The position of zig-zag wall 50 and the magnetization axial components of domains 46 and 52 are substantially unchanged from state 32 to state 34. Further, this two-domain surface state does not substantially decay in any manner with time.

In general, the presence of a zig-zag wall as in state 34 is disadvantageous for reading bits of information from a magnetic medium using head 40 because it has been determined that state 34 is highly correlated with weak secondary pulses during read-back which distort the read-back waveform. It is believed that the presence of zig-zag walls (and possibly their underlying domains) is often associated with the generation of a flux pulse when a bit in the magnetic medium passes near the region of the head surface containing the zig-zag wall. Further, it should be appreciated that in some cases both the trailing and leading sides of the head will exhibit such zig-zag walls. Moreover, depending upon the mechanical characteristics of the head, which result from such factors as stress, surface texture following lapping, contamination by magnetic particles, the apex angle, and the particular train of write pulses applied to the head, more than one zig-zag wall may be present on one side of the gap following the writing of a bit stream. This is due, in part, to the high local coercivity of the oppositely-directed domains bounded by the zig-zag walls and the possibly unequal amplitudes of write pulses sequentially applied. Thus, states having three or more domains may exist following certain sequences of pulses. Despite the above, using the present invention, the adverse effects of weak secondary pulses associated with zig-zag walls can be substantially eliminated.

In accordance with the present invention, state 36 illustrates the nucleation and propagation of a second zig-zag wall 54 from gap 42 by the application of a reset pulse of, for example, positive 20 mA. It should be noted that the reset pulse has a polarity opposite to that of the negative write current pulse previously applied to head 40 (the negative write pulse placed the head in a non-preferred magnetic domain state). Zig-zag wall 54 corresponds to the boundary of a surface domain 56 having a magnetization axial component 58, which is pointed in substantially the same direction as component 46 but opposite to that of component 52. Also, zig-zag wall 50 does not move in response to the application of the reset pulse, but is substantially stable.

In state 36, domain 48 has only been partially reversed. In order to completely reverse domain 48 and return head 40 to a preferred, single-domain surface state, the magnitude of the reset current pulse applied thereto, according to the preferred embodiment, must be of a magnitude equal to or greater than that of the largest write current pulse previously generating one or more zig-zag walls to be removed from the head so that the second zig-zag wall 54 propagates away from the gap a sufficient distance.

Following the application of a reset pulse of, for example, 70 mA, state 38 is achieved in which head 40 has a single-domain surface state and any zig-zag walls have been substantially removed. These zig-zag walls have been substantially annihilated by the propagation of domain 56 and zig-zag wall 54 away from the gap for a distance about equal to or greater than that of domain 48 and zig-zag wall 50. In state 38, head 40 has a substantially single domain 60 with a magnetization axial component 62 pointed in a direction substantially equal to that of component 46 of state 30.

The above method for annihilating a zig-zag wall also applies to cases having more than one remanent zig-zag wall. It is sufficient to annihilate zig-zag walls in such cases if the reset pulse applied is about equal to or larger than the largest of the previous set of write current pulses that generated the zig-zag walls. Also, the present invention will simultaneously annihilate zig-zag walls that have formed on opposite sides of the gap because the application of a reset pulse of sufficient magnitude will propagate annihilating zig-zag walls from both sides of the gap and thereby return both sides to single-surface domain states.

It has been observed that the magnitude of the weak secondary pulses associated with the presence of zig-zag walls is, in some cases, strongly dependent upon whether the magnetic head has a defect. These defects include defects that are either a result of manufacture or of contamination by air-borne particles. Examples of such defects include non-magnetic voids or inclusions in the ferrite pole. Such defects are detectable from the localized disturbance observed during motion of zig-zag walls. More specifically, no substantial secondary pulse distortion has been observed when testing single-crystalline ferrite MIG heads of the same size and design as heads not having such defects. However, it is believed that in other cases that heads without substantial defects may exhibit weak secondary pulses of sufficient magnitude to create adverse distortion. The present invention would be useful to remove such distortion.

On the other hand, heads having a substantial defect and at least one zig-zag wall have been observed to be associated with weak secondary pulses of a substantial magnitude. Observations of the propagation of zig-zag walls in such heads has indicated that the zig-zag walls are pinned in the immediate region of a defect. Walls that are so pinned have their pulsed propagation inhibited locally at this defect region. This causes distortion from the zig-zag wall shape. Further, it is believed that this pinning is significant because the wall segments that deviate from the general zig-zag shape are the most likely to respond to the flux pulse generated there when a write transition passes by.

Figure 5:
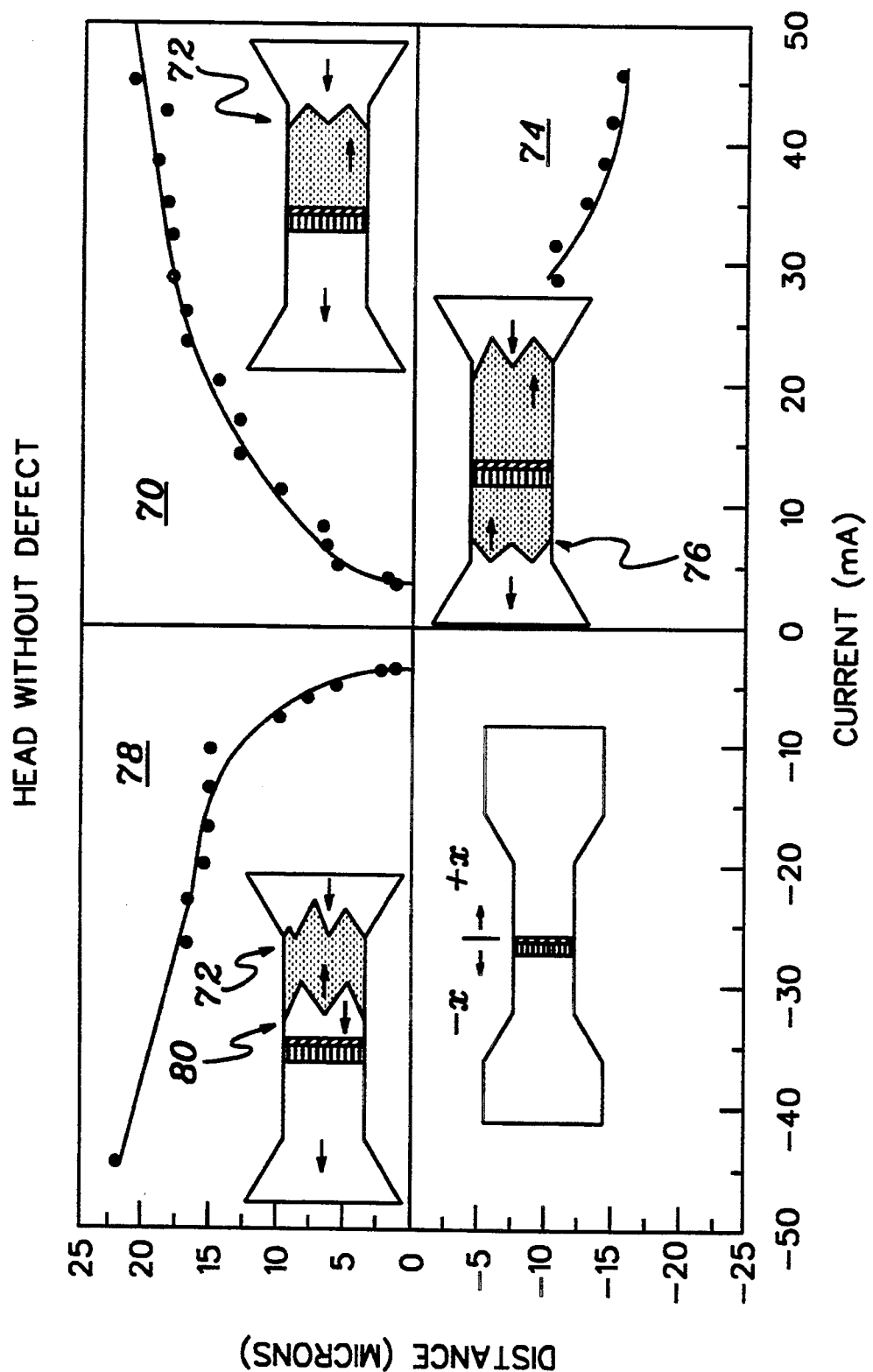
FIG. 5 is a graph illustrating the propagation distance away from the gap centerline, in an MIG head having no substantial defects, of a zig-zag wall versus the magnitude of the current applied to the head.

FIGS. 4 and 5 illustrate the propagation distance (i.e. average displacement) of a zig-zag wall as a function of head current for heads both without substantial defects and heads therewith. Also, for each type of head, the displacement is illustrated for both the trailing and leading sides of the gap. These two figures correspond, for example, to heads having the following characteristics: The narrow pole tip of single crystal ferrite (with nominal composition $Mn^{2+}_{0.59}Zn^{2+}_{0.31}Fe^{2+}_{0.12}FE^{3+}_{2}O_4$) was machined by laser-enhanced etching, rather than by grinding or laser machining. The crystallographic orientation is selected as (110) for the side edges, (110) for the air-bearing surface, and (100) for the pole face at the gap. It is expected that for other narrow-track heads made with single-crystal poles, the propagation function will be substantially similar, even if the yoke itself is polycrystalline.

Also, for polycrystalline heads, if at least one grain is present that is large enough to support a zig-zag wall and it has a (110) orientation, then zig-zag walls may be nucleated and annihilated as described here for the present invention. In some cases, the propagation of the wall leads to its annihilation when it contacts a grain boundary. However, where a wall remains in a grain, it may be annihilated by the application of a reset current pulse according to the present invention.

For contact recording as in the case of video recording heads, an orientation of (111) for the air-bearing surface provides more suitable mechanical properties such as resisting grain pullout during contact recording. From magnetic response considerations, air-bearing surfaces with either a (110) or a (111) orientation contain magnetic easy axes in the cubic ferrite materials having negative magneto-crystalline anisotropy. It is necessary for the air-bearing surface to contain an easy axis to avoid the domain branching effect which results in increased Barkhausen noise, decreased permeance, and variable remanence and response. It is also necessary that the easy axes be oblique to the pole axis to provide internal magnetic restoring torques on the magnetization when it deviates from equilibrium during a write or read operation. In the pole tips here, the easy axis directions of magnetization are oblique to the pole (100) axis.

FIG. 5 is a graph illustrating the mean propagation distance in microns away from the gap centerline, in a head having no substantial defects, of a zig-zag wall versus the magnitude of the current applied to the head. Line 70 in the top right quadrant of the graph plots the propagation distance of a zig-zag wall 72 away from the gap centerline into the leading side of the head as a function of the current applied to the head-coils. As illustrated by line 70, zig-zag wall 72 nucleates substantially proximate to the gap of the head and moves a distance that monotonically increases with the current applied to the head-coils.

As mentioned previously, zig-zag walls may also be formed on the trailing side of the gap. Line 74 illustrates the propagation distance of a zig-zag wall 76 into the trailing side of the head. For this particular type of head, nucleation of a zig-zag wall requires a higher magnetomotive force, corresponding to a head-coil current of 30 mA. The asymmetric nucleation and propagation behavior observed here are due to the asymmetry in the head construction. Because of the sendust layer on the trailing edge of the gap, flux density in the ferrite on this side is smaller than that on the leading side of the gap. Other factors affecting flux density include differences in the apex angles at the base of each pole of the head.

For both sides of the head, nucleation starts preferentially at the corners of the ferrite in the gap. Also, after turning off the applied current, zig-zag walls 72 and 76 remain at their extreme positions and do not respond to small applied currents, indicating a high surface coercivity. Further, on applying a small negative current to the head-coils (i.e. a current having a polarity opposite to that which propagated zig-zag walls and placed the head in a non-preferred state), the walls do not move back toward the gap. Because of the higher flux density at the pole tip due to the apex angle, the nucleation of a new wall requires less energy than that needed to overcome the zig-zag wall coercivity.

Line 78 illustrates the propagation distance of a second zig-zag wall 80 into the leading side of the head. As wall 80 propagates with increasing current magnitude, wall 72 remains substantially fixed in position. Usually, if the applied opposite-polarity current is of a magnitude equal to or greater than that of the current which propagated the first zig-zag wall, then both walls are substantially annihilated, returning the region substantially proximate to the gap to a single-domain surface state.

Also, as shown in the lower right quadrant of FIG. 5, a second zig-zag wall is propagated into the trailing side of this head. Although not described in detail above, the annihilation of zig-zag walls on the trailing side occurs substantially as for the leading side. A person skilled in the art will recognize that the present invention is used for the trailing side in substantially the same manner as for the leading side.

Figure 6:
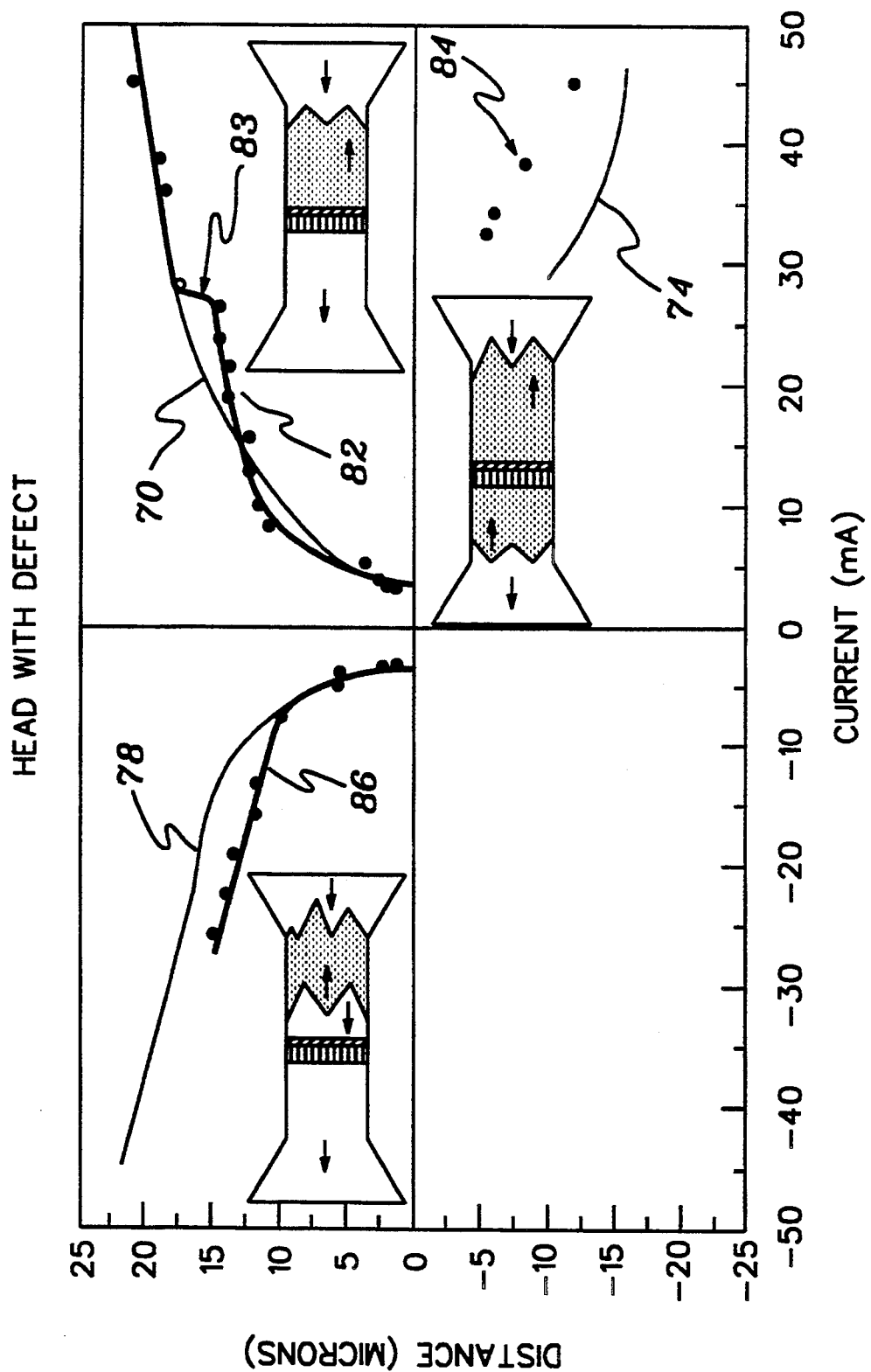
FIG. 6 is a graph illustrating the propagation distance away from the gap centerline, in an MIG head having a substantial defect, of a zig-zag wall versus the magnitude of the current applied to the head.

FIG. 6 is a graph illustrating the mean propagation distance in microns away from the gap centerline, in a head having a substantial defect, of a zig-zag wall versus the magnitude of the current applied to the head. The characteristics of a head having the behavior illustrated in FIG. 6 are substantially similar to that of the head for FIG. 5 except that the head of FIG. 6 exhibited secondary pulses in spin stand testing, whereas the head of FIG. 5 did not. The units and x and y-scales are identical in FIGS. 4 and 5. For purposes of comparison, lines 70, 74, and 78 from FIG. 5 are reproduced on FIG. 6.

Line 82 shows propagation distance versus applied current for the leading side of the head. Portion 83 of line 82 exhibits a kink which is not present in line 70 for a head without a substantial defect. Such a kink has been observed to be associated with localized defects in the ferrite material as caused, for example, by inclusions or voids.

Points 84 show propagation distance versus applied current for the trailing edge of the head, and line 86 shows the propagation distance of a second zig-zag wall versus negative applied current for the leading edge.

According to the present invention, zig-zag walls in heads having one or more defects are annihilated in substantially the same way as for heads having no substantial defects. The removal of zig-zag walls from heads with a defect substantially eliminates read-back distortion due to secondary pulses. This is an important advantage to the direct access storage device industry because it permits heads with defects to be accepted at quality control checkpoints which would otherwise be rejected due to the detection of weak secondary pulses. Further, the present invention increases the probable useful life of magnetic heads because it increases a heads resistance to deleterious effects from particle contamination. For example, it has been observed that certain particulate contamination on the head in the critical region near the gap interacts with the zig-zag walls described above to produce weak secondary pulses. According to the present invention, the elimination of these walls removes the distortion produced by secondary pulses.

When testing heads for quality control, where the head has a defect, it is possible in some cases that the head will pass. As one skilled in the art will recognize, depending upon the particular sequence and magnitudes of current pulses applied to the head during a write pulse train, the head will sometimes be left in a single-domain surface state. Even though such a head may have a defect, it will pass quality control because distortion from secondary pulses will not be observed in the absence of zig-zag walls. Thus, another advantage of the present invention is that it avoids the above problem of falsely passing defective heads because weak secondary pulses will substantially not appear even if a head has a defect.

Figure 7:
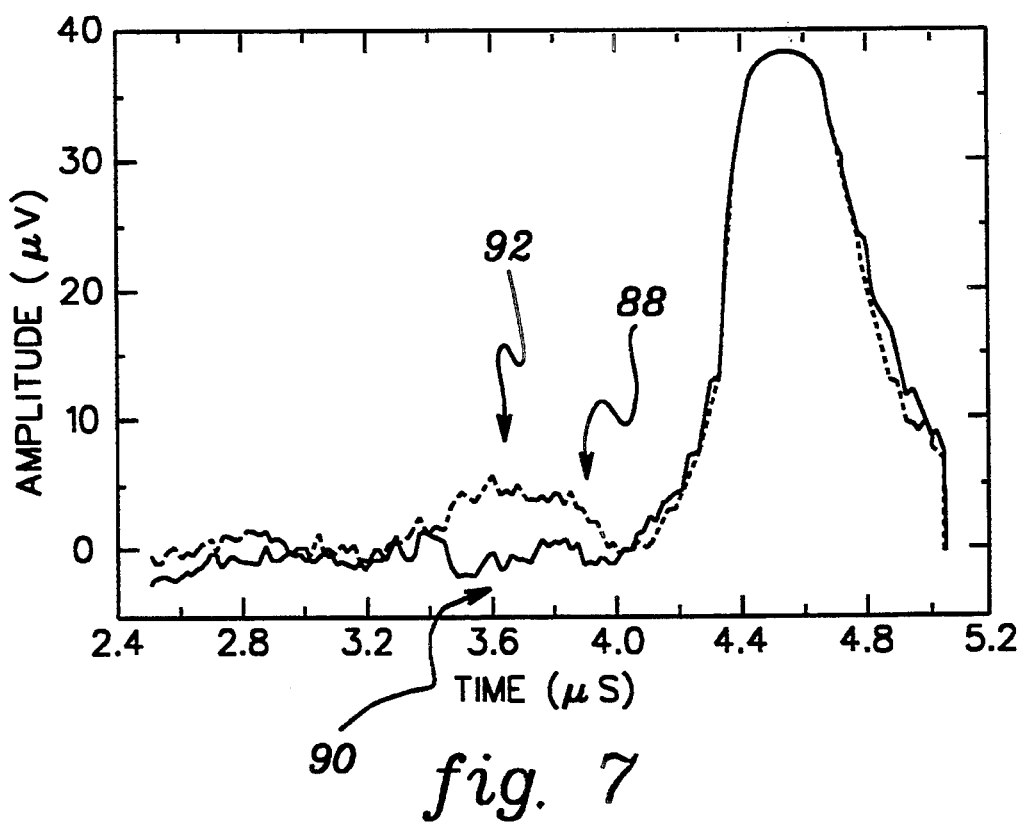
FIG. 7 is a graph comparing a first waveform, which exhibits a weak secondary pulse and corresponds to a head having a zig-zag wall, with a second waveform, which does not exhibit a secondary pulse and corresponds to the same head as for the first waveform, but where the zig-zag wall has been annihilated according to the present invention.

FIG. 7 is a graph comparing a first read-back waveform 88, which exhibits a weak secondary pulse and corresponds to a head having a zig-zag wall, with a second waveform 90, which does not exhibit a secondary pulse and corresponds to the same head as for the first waveform, but where the zig-zag wall has been annihilated according to the present invention.

The measurement conditions for the data in FIG. 7 are provided below for the purpose of further description of the present invention, but the scope thereof is not intended to be limited to the details thereof.

Measurements were made on a spin stand tester which allowed variation of disk velocity, head reset and write currents, recorded signal frequency, and head position. The testing was conducted at a nominal disk velocity of 8 m/s, with a recording signal frequency of 125 kHz on a thin film disk with a coercivity of 1230 Oersted. The magnitude of the write current pulse used was positive 45 mA (zero-to-peak).

First, a signal track was written using the nominal values for write current and frequency. Second, the recording head was moved away from the signal track a distance of about 20 microns to avoid disturbing any of the recorded test track data bits (in general, a distance corresponding to multiple track widths is appropriate). Third, a positive DC reset pulse current of 70 mA (zero-to-peak) was applied to the head. Fourth, the head was moved back to the test signal track and the read-back signal was read and stored on a digital oscilloscope. A larger number of such signals were read and averaged to give waveform 88 in FIG. 7. Portion 92 of waveform 88 is a weak secondary pulse due to the interaction of a zig-zag wall with a defect in the head.

Next, the head was moved off-track again. According to the present invention, while off-track, a DC reset pulse of negative 70 mA (i.e. having a polarity opposite to that of the last pulse of the write current waveform or opposite to the immediately preceding DC erase current pulse) was applied. The head was moved back to the signal track and the data bits were read back again. A large number of read-back cycles were performed and averaged, and are given as waveform 90 in FIG. 7. The present invention substantially eliminated any distortion due to weak secondary pulses.

For single-crystalline ferrite MIG heads, zig-zag walls are typically observed at distances between 5 and 20 microns from the center of the gap of the head. The distance-equivalent positions of the secondary pulses observed, such as in the oscilloscope waveform in FIG. 7, also correspond to and fall within this range.

Figure 8:
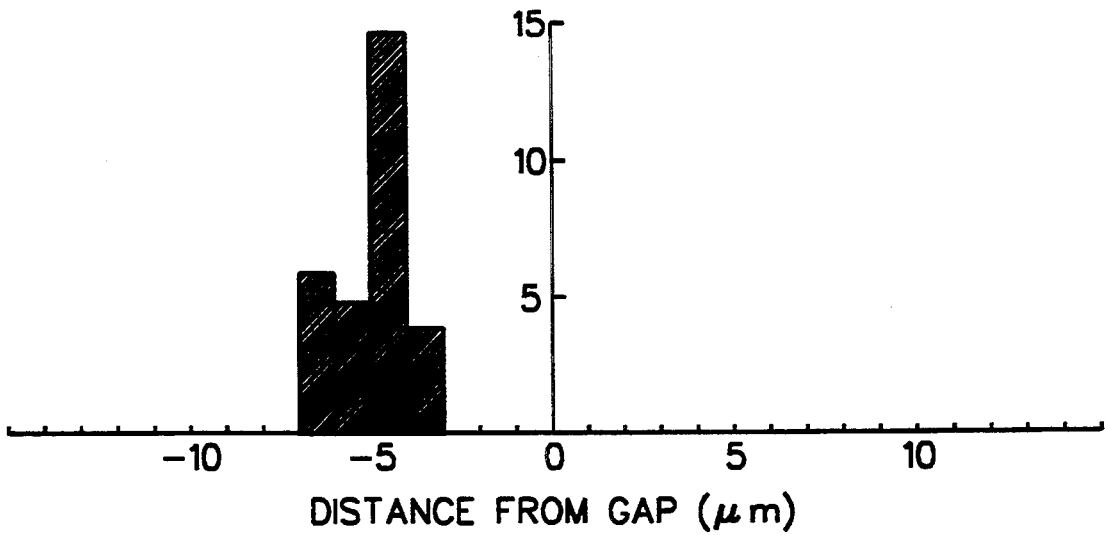
FIGS. 8–10 are histograms illustrating typical positions relative to the gap in an MIG head for weak secondary pulses observed when reading data without the use of the reset procedure according to the present invention.
Figure 9:
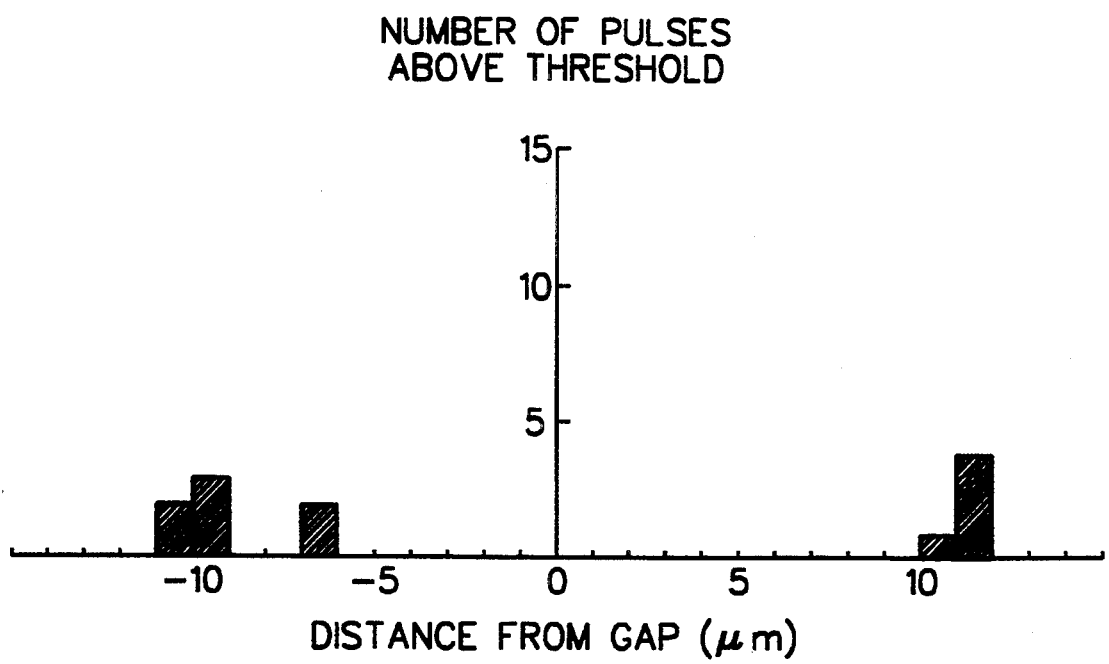
Figure 10:
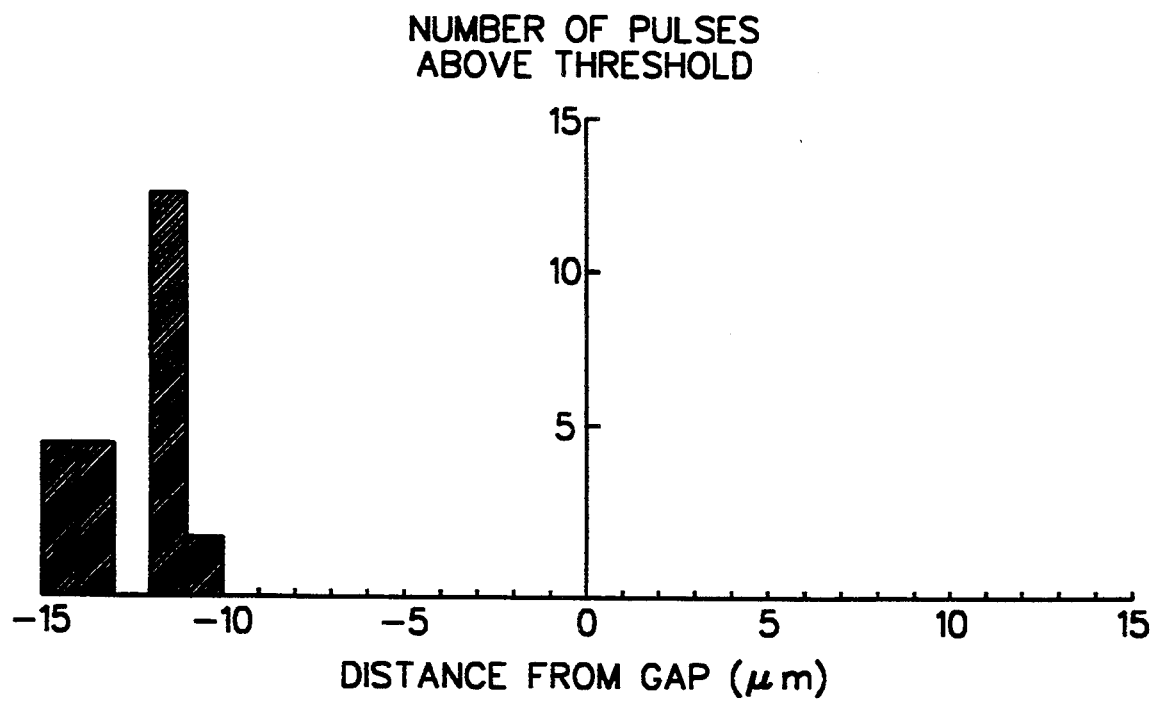

FIGS. 8–10 are histograms prepared from experimental data that illustrate typical positions relative to the gap in an MIG head for weak secondary pulses observed when reading data using a head with a defect and having a zig-zag wall. The measurement conditions for this data are provided below for the purpose of further description of the present invention, but the scope thereof is not intended to be limited to the details thereof. In general, the number of secondary pulses that were above a minimum threshold of about 1.5 millivolts (note: this threshold varies with the specific test apparatus and is used to reduce data noise) and that fell within a specified distance range from the gap were counted to form each of the vertical bars in the histograms. The position of the gap centerline was assumed to be that of the peak position of a main data pulse on each waveform. These histograms were prepared using data obtained from twenty oscilloscope read-back waveforms taken after every write/read cycle. The horizontal axis of the histograms indicates the distance from the gap centerline. Positive distances correspond to the trailing side of the gap, and negative distances correspond to the leading side of the gap.

The measurement conditions were as follows: The recording current was a 45 mA (zero-to-peak) symmetric bipolar pulse; the recording frequency was 125 kHz; the measurement radius position was 21 mm; the disk rotational speed was 7.8 m/s; the disk coercivity was 1200 Oersted; the IC amplifier used was a standard low noise amplifier; and the filter used was a 3.9 MHz (Bessel) filter.

Although specific data is presented in FIGS. 8–10, it is expected that, in general, secondary pulse behavior for other heads will be similar to that shown in FIGS. 8–10.

As described previously, the presence of weak secondary pulses in a read-back waveform due to zig-zag walls is disadvantageous. According to the method of the present invention, these secondary pulses can be substantially eliminated by resetting a magnetic head following a write operation so that the region near the gap of the head is in a substantially single-domain surface state prior to a read operation.

In the preferred embodiment, this conditioning is accomplished by applying a reset pulse, or a series of pulses, to the head that has a predetermined reset polarity. In the preferred embodiment, the reset pulse is applied only where the last write pulse has a polarity that is different from the reset polarity. Where the last write polarity is the same as the reset polarity, then no reset pulse is applied. Each reset pulse has a magnitude substantially equal to or greater than that of the largest previous write pulse (i.e. the write pulse corresponding to the zig-zag wall having the greatest propagation distance) since the head was last in a preferred single-domain surface state. Specifically, in the preferred embodiment, the reset pulse is up to about 70 percent greater in magnitude than the write pulse.

The reset polarity is that polarity of current that, when applied to the head-coils in sufficient magnitude and duration, places the head in the most preferred magnetic domain state for reading. For example, this preferred state corresponds to the substantially single-domain state described above. However, a person skilled in the art will recognize that the present invention may be used in other applications to place the head in a state that is preferred for reasons not directly related to the head's domain state. In practice, the reset polarity is determined by running read/write tests with a particular head to determine which reset polarity applied to its head-coils places it in the most preferred state for reading. This polarity is the reset polarity for that head. These types of tests are well-known. Also, it is not usually necessary to test each head for its preferred reset polarity. Instead, where the other physical factors associated with a head design remain substantially constant, the preferred reset polarity for heads of that design is expected to be constant for a large number of heads. Typically, the head design determines the preferred reset polarity.

The applied reset pulse is substantially a direct current pulse of substantially constant polarity. The particular amplitude and shape of the pulse are preferably customized for the particular type of recording head which will be used, such as MR, inductive thin film, ferrite, ferrite MIG, ferrite double MIG, VTR, or HDTV. In the preferred embodiment the shape of the pulse is substantially square and of duration similar to that of a write pulse.

The reset pulse of the present invention is in contrast to prior methods that use bipolar pulse trains or sinusoidal currents with gradually-decreasing magnitude with time, such as in processes like a demagnetizing cycle to remove residual magnetism or to reach a minimum energy domain pattern. Instead, the reset pulse of the present invention is deterministic in its effects upon the domain state of the head because a single pulse resets the domain pattern.

Also, prior to applying a reset pulse, either the head must be positioned over a dedicated track of the magnetic medium which does not correspond to stored data or the reset pulse must be applied only during those time periods in which the head is flying over gaps in the data sectors of the medium (areas not used to store data). However, other positionings or timings which will prevent corruption of data stored on the medium may be used in other embodiments of the present invention.

In an alternate embodiment of the present invention, the head is returned to a single-domain surface state by always applying a reset pulse having the reset polarity to the head prior to reading regardless of the polarity of the last write current pulse. In the case where the last write polarity is different from the reset polarity, substantially the same result as above will occur. On the other hand, where the last write polarity is the same as the reset polarity, a reset pulse having the reset polarity is applied to the head even though it is already in the preferred magnetic domain state. The head will remain in the preferred state because the application of more than one current pulse having the reset polarity does not remove the head from the preferred domain state, but is instead somewhat redundant in its effect on the head. Unlike the embodiment above, in this embodiment, following every write pulse train and prior to reading, the head is always either re-positioned for applying a reset pulse or a reset pulse is applied when the head is over a sector gap.

The electrical components necessary to implement the method according to the present invention as described above are all well-known to a person skilled in the art. However, U.S. Pat. No. 5,053,892 (Supino, Jr. et al. and issued to Digital Equipment Corporation) describes an example of a magnetic disk storage system and is hereby incorporated by reference in full.

Although the present invention has been described in detail above, it is not intended to be limited to the specific form set forth herein, but, on the contrary, it is intended to cover such alternatives and equivalents as can reasonably be included within the spirit and scope of the invention as defined by the appended claims.

For example, the present invention is not limited to ferrite MIG heads, but may also be used with other heads designed for direct-access storage, video recording, or high definition video recording. Also, in other embodiments, certain types of heads may be reset by applying an external magnetic field to the head.

We claim:

1. A method for conditioning a magnetic data recording and reading device having a magnetic read/write head, said head having a gap and being used for storing information in a stored data region on a magnetic medium, comprising the steps of:
    selecting a reset polarity, said reset polarity corresponding to a polarity that places the head in a preferred magnetic domain state for reading;
    storing the polarity of a last write current pulse applied to said magnetic head;
    performing a polarity comparison of said last write polarity and said reset polarity, the result of said polarity comparison being different if said last write polarity and said reset polarity are different and being equal if said last write polarity and said reset polarity are the same; and
    if the result of said polarity comparison is different, then:
        positioning said magnetic head away from said stored data region of said magnetic medium; and
        applying at least one reset current pulse having said reset polarity to said magnetic head.

2. The method of claim 1 wherein said reset current pulse has a magnitude at least substantially equal to that of a largest of write current pulses applied to said head since a last-applied reset current pulse.

3. The method of claim 1 wherein said step of applying a reset current pulse comprises applying a reset current pulse for a time period sufficient to provide a region of substantially uniform magnetization in the vicinity of said gap.

4. The method of claim 1 wherein said step of applying a reset current pulse comprises applying a reset current pulse for a time period sufficient to substantially annihilate a zig-zag wall substantially proximate to said gap.

5. The method of claim 4 wherein said zig-zag wall is located less than about 20 microns from said gap.

6. The method of claim 4 wherein said annihilation comprises the removal of a substantially stationary first zig-zag wall by a second zig-zag wall that nucleates substantially proximate to said gap and propagates therefrom.

7. The method of claim 1 wherein said step of applying a reset current pulse comprises applying a reset current pulse of sufficient magnitude and for a sufficient time period to propagate a region of magnetization, having an oppositely-directed axial component, a sufficient distance away from said gap and into the body of said magnetic head to return said magnetic head to a substantially one-domain surface state.

8. The method of claim 7 wherein said propagation comprises propagation of a magnetic surface domain, having an oppositely-directed axial component, that nucleates in a region substantially proximate to said gap.

9. The method of claim 8 wherein said propagation distance monotonically increases with the magnitude of said reset current pulse.

10. The method of claim 1 wherein said reset current pulse is of constant polarity.

11. The method of claim 1 wherein said reset current pulse is substantially a direct current pulse.

12. The method of claim 1 wherein said step of applying a reset current pulse comprises applying a reset pulse sufficient to produce a known remanent configuration.

13. The method of claim 1 wherein said magnetic head comprises a thin-film head.

14. The method of claim 13 wherein said magnetic head further comprises at least one film of permalloy.

15. The method of claim 1 wherein said step of applying a reset current pulse comprises applying only a single current pulse of constant polarity.

16. The method of claim 15 wherein said single reset current pulse is of an amplitude up to 70 percent greater than that of a largest of write current pulses applied to said head since a last-applied reset current pulse.

17. The method of claim 1 wherein said step of positioning comprises positioning said head substantially proximate to a region of said magnetic medium not used to store data.

18. The method of claim 1 wherein said magnetic head is a single-crystal ferrite, metal-in-gap head.

19. The method of claim 1 wherein said step of storing comprises storing said polarity in a register.

20. The method of claim 1 wherein said step of positioning said magnetic head comprises timing the application of said reset current pulse to correspond to at least one time period in which said head is in a position relative to said magnetic medium such that stored data thereon is substantially unaffected during the application of said reset pulse current.

21. The method of claim 20 wherein said time period corresponds to a period when said head is substantially over a gap in data sectors of said magnetic medium.

22. A method for conditioning a magnetic data recording and reading device having a magnetic read/write head, said head being used for storing information in a stored data region on a magnetic medium, comprising the steps of:

selecting a reset polarity, said reset polarity corresponding to a polarity that places the head in a preferred magnetic domain state for reading;

storing the polarity of a last write current pulse applied to said magnetic head;

performing a polarity comparison of said last write polarity and said reset polarity, the result of said polarity comparison being different if said last write polarity and said reset polarity are different and being equal if said last write polarity and said reset polarity are the same; and if the result of said polarity comparison is different, then applying at least one reset current pulse having said reset polarity to said magnetic head during one or more time periods in which said head is positioned over a portion of said medium not storing data.

23. The method of claim 22 wherein said reset current pulse has a magnitude at least substantially equal to that of a largest of write current pulses applied to said head since a last-applied reset current pulse.

24. The method of claim 23 wherein said reset current pulse is of constant polarity.

25. The method of claim 23 wherein said reset current pulse comprises a single pulse of an amplitude up to 70 percent greater than that of said largest of said write current pulses.

26. The method of claim 22 wherein said step of applying said reset current pulse comprises timing the application of said reset current pulse to correspond to at least one time period in which said head is in a position relative to said magnetic medium such that stored data thereon is substantially unaffected during the application of said reset pulse current.

27. The method of claim 26 wherein said time period corresponds to a period when said head is substantially over storage gaps in data sectors of said magnetic medium.

28. A method for conditioning a magnetic data recording and reading device having a magnetic read/write head, said head being used for storing information in a stored data region on a magnetic medium, comprising the steps of:

selecting a reset polarity, said reset polarity corresponding to a polarity that places the head in a preferred magnetic domain state for reading;

positioning said magnetic head away from said stored data region of said magnetic medium; and applying at least one reset current pulse having said reset polarity to said magnetic head.

29. The method of claim 28 wherein said reset current pulse has a magnitude at least substantially equal to that of a largest of write current pulses applied to said head since a last-applied reset current pulse.

30. The method of claim 29 wherein said reset current pulse is of constant polarity.

31. The method of claim 29 wherein said reset current pulse comprises a single pulse of an amplitude up to 70 percent greater than that of said largest of said write current pulses.

32. The method of claim 28 wherein said step of applying said reset current pulse is performed prior to every read operation using said head.

33. A method for conditioning a magnetic data recording and reading device having a magnetic read/write head, said head being used for storing information in a stored data region on a magnetic medium, comprising the steps of:

selecting a reset polarity, said reset polarity corresponding to a polarity that places the head in a preferred magnetic domain state for reading; and applying at least one reset current pulse having said reset polarity to said magnetic head during one or more time periods in which said head is positioned over a portion of said medium not storing data.

34. The method of claim 33 wherein said reset current pulse has a magnitude at least substantially equal to that of a largest of write current pulses applied to said head since a last-applied reset current pulse.

35. The method of claim 34 wherein said reset current pulse is of constant polarity.

36. The method of claim 34 wherein said reset current pulse comprises a single pulse of an amplitude up to 70 percent greater than that of said largest of said write current pulses.

37. The method of claim 33 wherein said step of applying said reset current pulse comprises timing the application of said reset current pulse to correspond to at least one time period in which said head is in a position relative to said magnetic medium such that stored data thereon is substantially unaffected during the application of said reset pulse current.

38. The method of claim 37 wherein said time period corresponds to a period when said head is substantially over storage gaps in data sectors of said magnetic medium.

39. The method of claim 33 wherein said step of applying said reset current pulse is performed prior to every read operation using said head.

40. An apparatus for magnetic data recording and reading comprising:

a magnetic read/write head for storing information in a stored data region on a magnetic medium; and means for applying a reset pulse to said magnetic read/write head when said head is not over said stored data region, said reset pulse having a reset polarity that places said head in a preferred magnetic domain state for reading.

41. The apparatus of claim 40 further comprising:

means for storing a polarity of a last write current pulse applied to said magnetic read/write head; and means for comparing the polarity of the last write current pulse to said reset polarity, said comparing means providing a result of said comparison to said applying means such that the reset pulse is applied only if the result is different.

42. The apparatus of claim 40 further comprising timing means for determining when said magnetic read/write head is not over said stored data region.

43. The apparatus of claim 40 wherein the reset pulse comprises a pulse of a constant polarity.

44. The apparatus of claim 41 wherein the reset pulse comprises a pulse of an amplitude up to 70 percent greater than that of said last write current pulse.

45. The apparatus of claim 41 wherein said means for storing comprises a one-bit register.

* * * * *